United States Patent [19]
Zennie

[11] 3,857,515
[45] Dec. 31, 1974

[54] LIQUID SPRAY DEVICE
[76] Inventor: Michael Maurice Zennie, 1274 Morten St., Cincinnati, Ohio 45208
[22] Filed: Apr. 4, 1974
[21] Appl. No.: 457,799

[52] U.S. Cl. ............... 239/169, 239/175, 239/289, 239/562, 239/DIG. 6, 56/16.8, 56/DIG. 5
[51] Int. Cl. ............................................. B05b 7/26
[58] Field of Search ........ 56/16.8, DIG. 5; 239/159, 239/164, 169, 172, 175, 289, 562, DIG. 6

[56] References Cited
UNITED STATES PATENTS

| | | | |
|---|---|---|---|
| 2,737,340 | 3/1956 | Bonini | 239/DIG. 6 |
| 3,017,121 | 1/1962 | Carlson | 239/159 X |
| 3,023,970 | 3/1962 | Knoell | 239/169 X |
| 3,534,533 | 10/1970 | Luoma | 56/16.8 |
| 3,722,820 | 3/1973 | Klint, Jr. | 239/DIG. 6 |

Primary Examiner—M. Henson Wood, Jr.
Assistant Examiner—John J. Love
Attorney, Agent, or Firm—Walter S. Murray

[57] ABSTRACT

The disclosure concerns a mobile liquid spray device for applying insecticides, weed killers and fertilizers on vegetation and is specifically adapted as an attachment for conventional power lawnmowers of the rotary type. The liquid spray device may be a portable unit that may be detachably mounted on a lawnmower whereby a lawn may be mowed and simultaneously sprayed with an insecticide, a weed killer or a fertilizer, as required.

18 Claims, 17 Drawing Figures

3,857,515

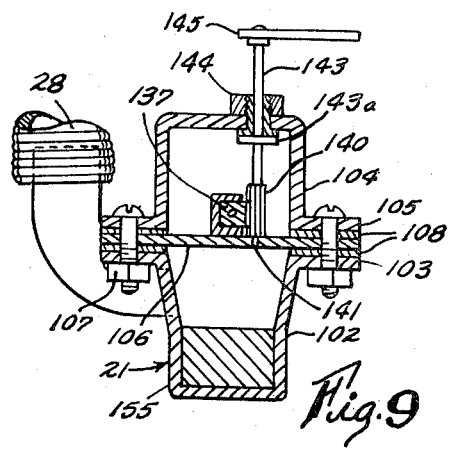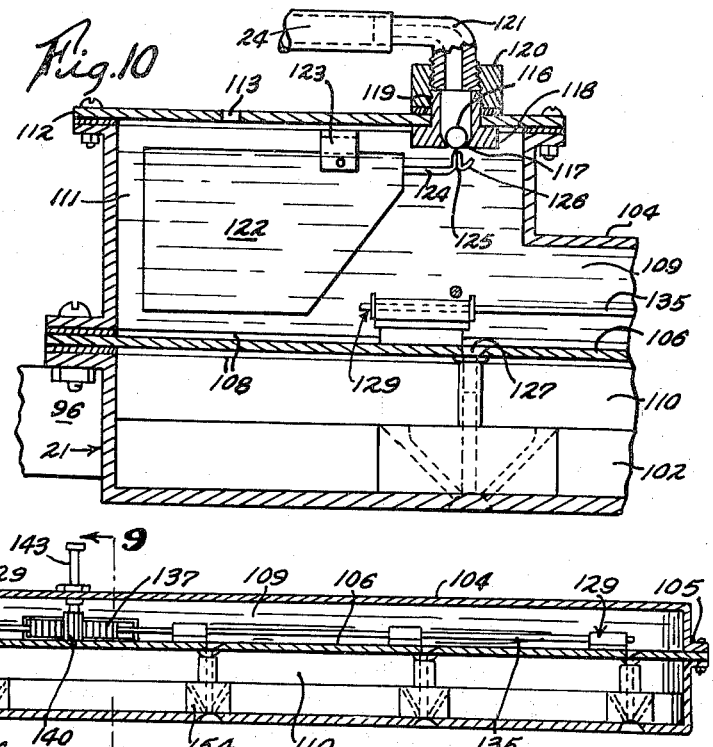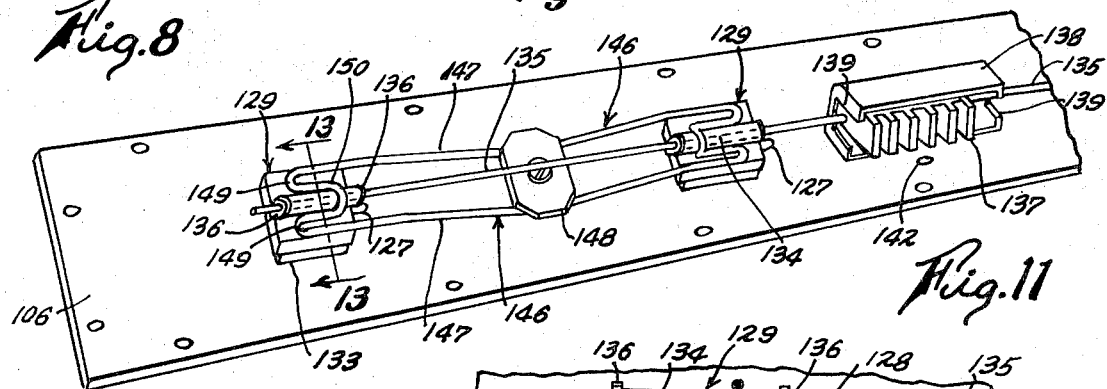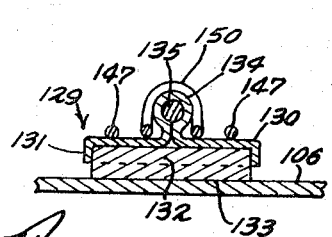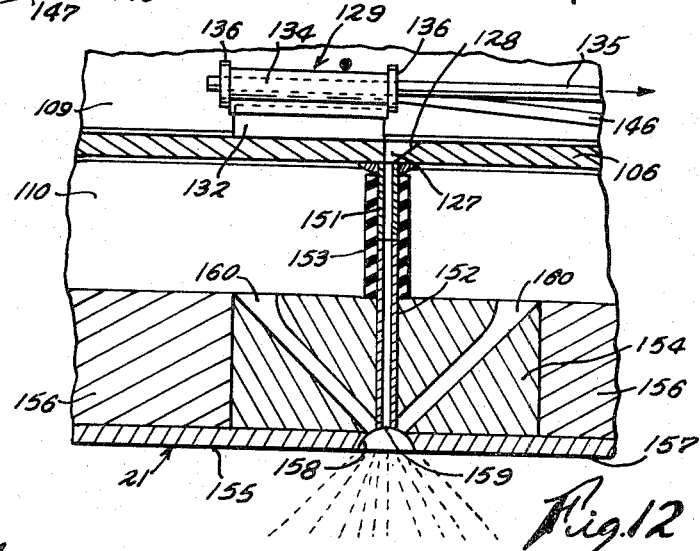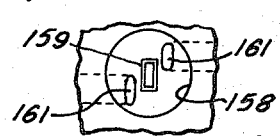

LIQUID SPRAY DEVICE

This invention relates to improvements in liquid spray devices in general and more particularly to devices for spraying insecticides, weed killers and fertilizers upon vegetation and which is especially useful as an accessory to lawnmowers, and other like small garden tools.

It is an object of the invention to provide a liquid spray unit having the foregoing characteristics which may be detachably mounted on conventional power lawnmowers of the rotary type whereby the lawnmowers may be used to mow the lawn in the usual manner and, when required, the unit may by readily mounted on the lawnmowers to spray liquid insecticides, weed killers and fertilizers on the lawn simultaneously with, or independently of, the normal mowing operations.

Another object of the invention is to provide a self-contained unit that may be stored or carried in a compact manner and may readily be attached to and operable by a power lawnmower to treat a lawn with the required liquid spray.

A further object of the invention is to provide an elongated liquid spray head particularly adapted as an element of my liquid spray unit to efficiently and effectively treat a lawn with a required substance.

It is a special object of the invention to provide a rugged liquid spray device that is included in a compact unit for storage and transportation, which is trouble free and can be readily assembled on or detached from a rotary power lawn mower by unskilled persons and which will provide trouble free service for use in treating lawns with a variety of liquid substances such as weed killers, insecticides and fertilizers.

With these and other objects and advantages in view, this invention consists of the several novel features of construction, arrangement and combination of parts, hereinafter fully set forth in the appended claims.

DESCRIPTION OF THE DRAWINGS

In the drawings:

FIG. 8 is a lateral section taken through the longitudinal center of the spray head for my unit.

FIG. 9 is an enlarged section taken on line 9—9 of FIG. 8.

FIG. 10 is an enlarged, sectional view through the valving device of the spray head.

FIG. 11 is a fragmental perspective view of a detail of the spray head.

FIG. 12 is an enlarged section through one spray head valve means.

FIG. 13 is an enlarged section taken on line 13—13 of FIG. 11.

FIG. 14 is a bottom plan view of one of the spray nozzles of the spray head.

GENERAL FEATURES OF THE DEVICE

Figure 1:
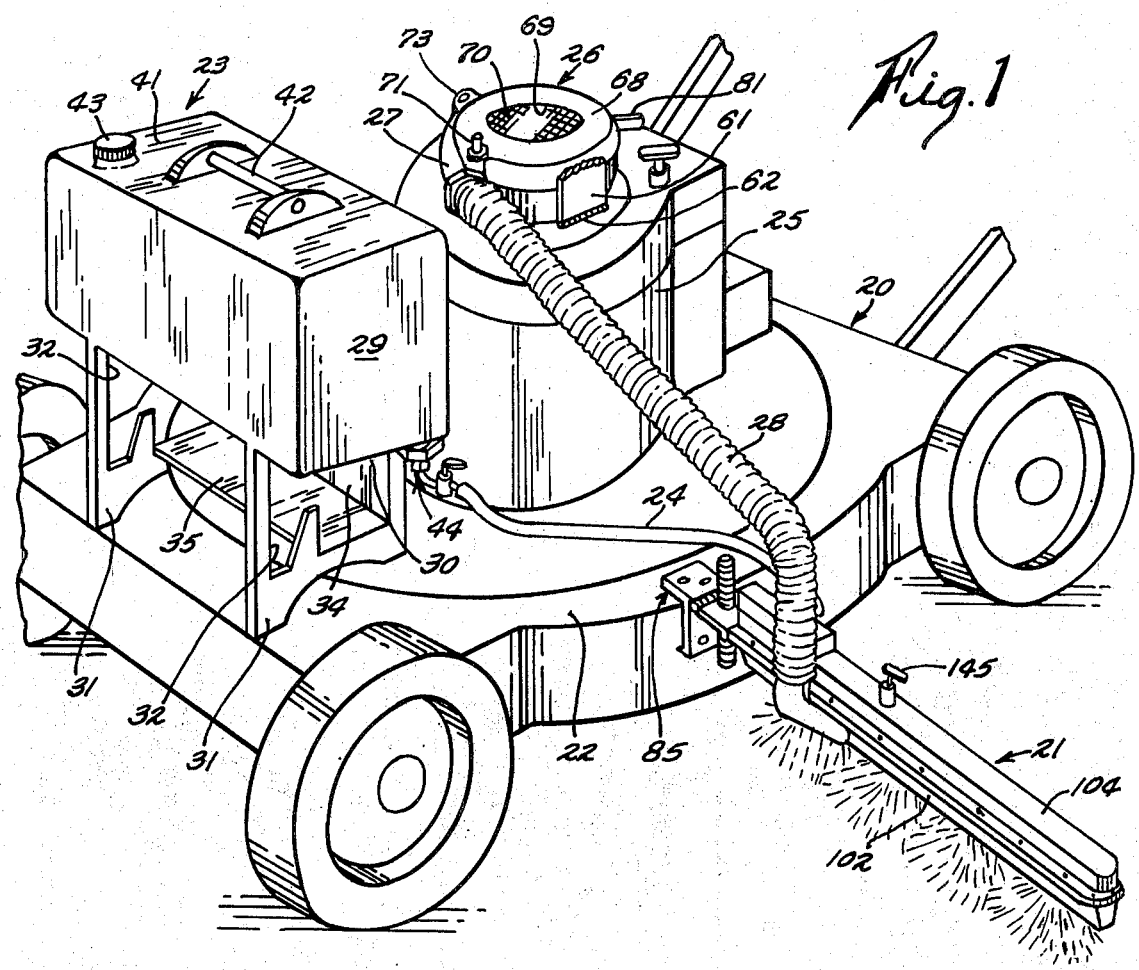
FIG. 1 is a fragmental, perspective view of my liquid spray device illustrated in association with a power lawnmower of the rotary type.
Figure 2:
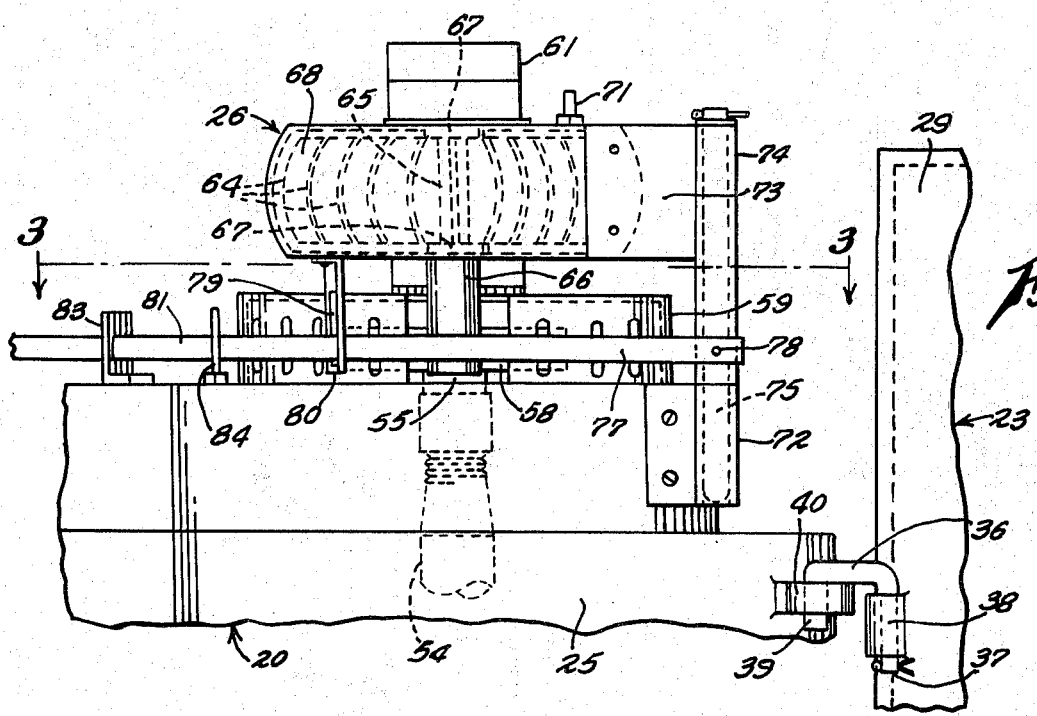
FIG. 2 is an enlarged fragmental view depicting the pneumatic pressure source of the unit in side elevation.
Figure 3:
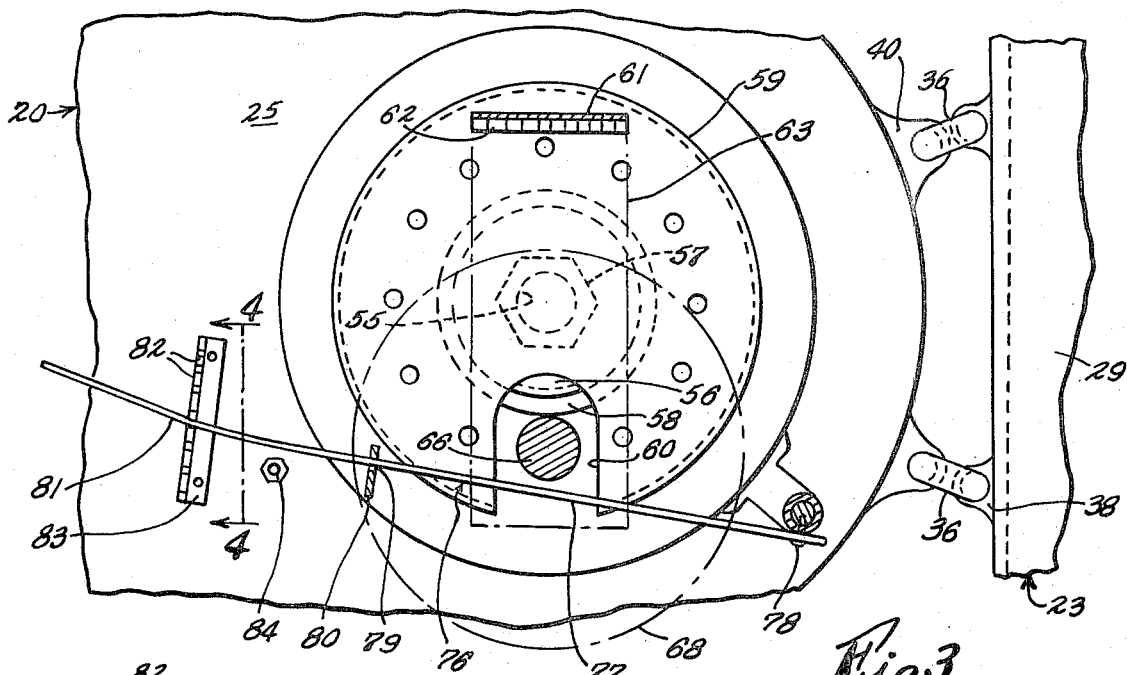
FIG. 3 is a section taken on line 3—3 of FIG. 2.

This invention is particularly adaptable to a rotary type power lawnmower generally indicated in FIGS. 1–3 of the drawings by the reference numeral 20. An elongated liquid spray head 21 is mounted on and projects laterally from the lawnmower deck 22, a liquid container 23 being positioned upon the front portion of the deck which serves as a refillable tank for liquid weed killer, insecticides or fertilizer. A flexible gravity flow hose 24 connects the bottom of the container with the spray head 21. Mounted upon the engine housing 25 of the lawnmower is a source of pneumatic pressure in the form of a blower, generally indicated by the reference numeral 26, which is driven by the lawnmower engine and has its pressure outlet port 27 connected to the spray head 21 by a flexible conduit 28. It will therefore be seen that the combination of elements generally set forth hereinbefore provide a liquid spray device that will apply required chemical substances upon a lawn simultaneously with the lawnmowing operation.

THE LIQUID CONTAINER

Now with specific reference to FIGS. 1, 2 and 3 of the drawings the liquid container 23 comprises a box-like tank 29 of substantial liquid capacity having an inclined bottom wall 30 and a pair of supporting legs 31—31 depending from and preferably one-piece with said bottom wall, the foot portions of the legs resting firmly upon the front portion of the deck 22 of the lawnmower. The legs have aligned openings 32—32 therein which are interconnected by a back wall 34 and a shelf 35 for purposes to be hereinafter set forth. As best shown in FIGS. 2 and 3 of the drawings the tank 29 is detachably secured to the lawnmower by a pair of inverted, U-shaped links 36—36, each having one prong 37 swiveled against axial movement in a lug 38 formed on the wall of the tank, while the opposed prong 39 is detachably received in a lug 40 formed on the engine housing 25 of the lawnmower. The upper wall 41 of the tank 29 has a handle 42 and a capped filling opening 43 formed thereupon.

Figure 7:
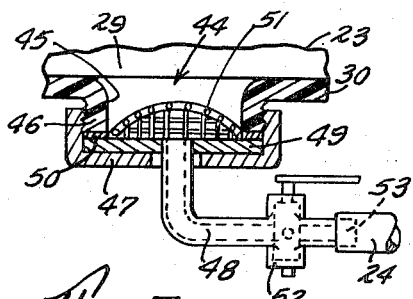
FIG. 7 is fragmental, section showing a detail of my unit.

The lowermost part of the inclined bottom wall 30 of the tank is provided with a liquid outlet 44 and with particular reference to FIG. 7 of the drawings the said bottom wall 30 has an opening 45 provided with an externally threaded, downwardly directed flange 46 which threadedly engages a nut 47. An elbow 48 extends through the nut 47 and has fixed on its inner end a cover plate 49 which extends across the flange 46, a gasket 50 sealing the plate around the flange when the nut is tightened thereon. A strainer 51 is positioned across the interior of the flange 46 to trap foreign matter from entering the hose 24 supplying the spray head. A plug valve 52 is fixed to the free end of the elbow 48 and has an outlet end 53 connected to the flexible hose 24.

THE COMPRESSED AIR MEANS

With particular reference to FIG. 2 of the drawings the numeral 54 indicates the upper end of the engine driven vertical shaft for the rotary powermower, said shaft being threaded to receive a shaft extension member 55 which has keyed to its upper end a peripherally grooved wheel 56. The wheel hub is secured to the extension 56 by a nut 57 and mounts a tire 58 preferably composed of a suitable resilient, friction-like material. A perforate shroud 59 is mounted upon the housing 25 to enclose the wheel, said shroud having a radial opening 60 formed therein which is normally guarded by a closure plate 61 hinged at 62 on the shroud and held in the closed position illustrated by dot-and-dash lines 63 in FIG. 3 by a suitable snap-on connection (not shown).

The blower 26 is of the centrifugal type and includes a series of radial blades 64 mounted on a central hub 65, said hub having a coaxial, driven member 66 connected therewith and extending downwardly into the plane of rotation of the wheel 56. The hub is mounted for rotation in suitable bearings 67—67 fixed centrally to a circular blower housing 68, said housing having a centrally located air inlet opening 69 guarded by a screen 70. The pressure outlet port 27 is offset with respect to the housing 68 and may have a normally capped nozzle 71 therein to which the hoses of other garden spray and dusting equipment may be attached, when required.

The blower is detachably mounted upon the lawnmower by the provision of a bracket 72 (FIG. 2) fixed to and projecting from the engine housing 25, the blower housing 68 having a lateral bracket 73 fixed thereto which carrries a downwardly extending sleeve portion 74 that abuts the lug 72, the sleeve having fixed therein a pin 75 that rotatably engages in the lug 72.

Figure 4:
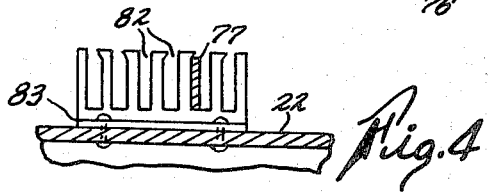
FIG. 4 is an enlarged section taken on line 4—4 of FIG. 3.

A clutch member 76 for selectively engaging and disengaging the engine drive wheel 58 and the blower connected driven shaft 66 when the spray device has been detachably mounted on the engine housing 25 of the lawnmower comprises a flexible lever 77 mounted for vertical swinging movement on the sleeve 74 by a pivot pin 78, said lever extending through a vertical slot 79 formed in a lug 80 depending from, and fixed to the underside of the blower housing 68. The free end portion 81 of the flexible lever 77 is selectively engageable in any one of a lateral series of upwardly opening teeth 82 formed on a boss 83 mounted upon the housing 25; and upwardly extending stop 84 being mounted on the housing 25 adjacent the boss to engage the lever in a clutch disengaged position. By swinging the lever 77 upwardly around its pivot pin 78, and then moving the lever clockwise (FIG. 3), the blower housing 68 by its lug connection with the lever will also move clockwise whereby the engine drive wheel 58 and the driven shaft 66 will be engaged, the clutching force of their driving connection being determined by the tooth 82 into which the lever is dropped for operation of the blower. When it is required to disengage the clutch the lever 77 is moved counter-clockwise against the stop 84 and into a tooth 82 at the left of the boss as it is shown in FIG. 4 of the drawing.

THE SPRAY HEAD MOUNT

Figure 6:
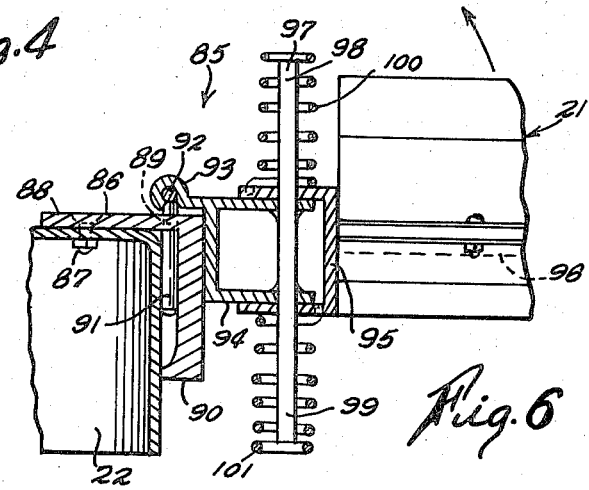
FIG. 6 is an enlarged section taken on line 6—6 of FIG. 5.
Figure 5:
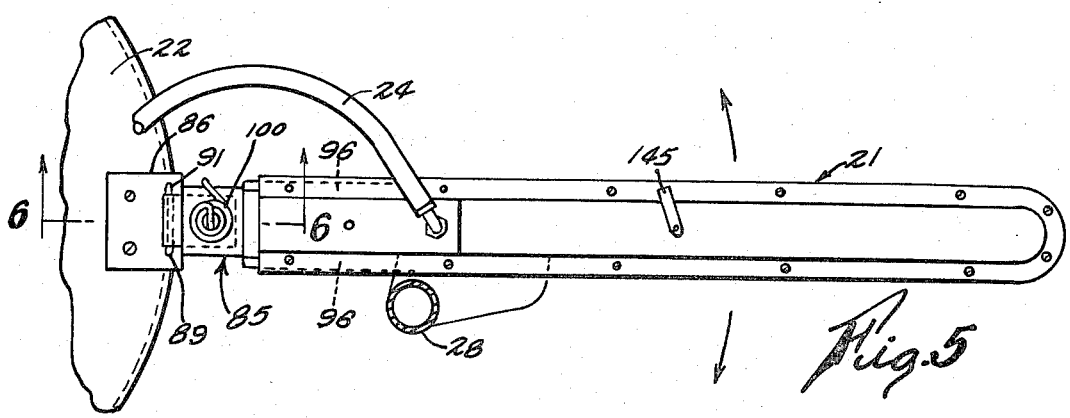
FIG. 5 is a top plan view of the liquid spray head for my unit detachably mounted on a powermower deck, shown broken away.

The spray head 21 is detachably mounted for vertical and horizontal swinging movements on a side portion of the lawnmower deck 22 by an assembly 85 which as best illustrated in FIGS. 5 and 6 of the drawings comprises an inverted L-shaped bracket 86 fixed to the deck by bolts 87, the horizontal part 88 of the bracket having a pair of holes 89 formed therein while its depending part 90 is spaced from the deck. The bracket is adapted to detachably receive the legs of an inverted, U-shaped pintel 91 which pass through the holes 89 and are lodged between the depending bracket part 90 and the underlying portion of the deck 22. The horizontal pintel portion 92 freely extends through a sleeve 93 integral on a first channel-shaped member 94, a second channel-shaped member 95 overlying the first member and provided with spaced extensions 96—96 which embrace and are fastened by welding to the opposed sides of the spray head 21. As best shown in FIG. 6 the central portion of a vertical pivot pin 97 is fixed on the first channel-shaped member 94 by means of welding, or the like, said pin having upper and lower portions 98 and 99, respectively, which freely pass through holes in the second member whereby the spray head is pivotally mounted for horizontal swinging movement on the mount 85 while the hinged connection between the pintel 91 and the sleeve 93 of the first member 94 allows for upward swinging movement of the spray head on said mount.

To maintain the spray head in a normally resilient, laterally extended position on the lawnmower deck at approximately right angles to the path of travel of the mower a pair of counteracting coiled springs 100 and 101 encircle the upper and lower pin portions 97 and 98, respectively, each spring being under tension in counteracting directions and each having its outer end anchored in its respective pin end; the opposed inner ends of each spring bearing against an opposite side of the second member 96. When the spray head 21 accidently hits an obstruction during use of the lawnmower the counteracting springs will allow the spray head to pivot against the bias of a spring to clear the obstruction and upon clearance thereof the counteracting springs will return the spray head to its normal laterally extended position shown in FIG. 5 of the drawings. When not in use the spray head may be pivoted upwardly on the hinge 92–93 against the side of the engine housing 25.

THE SPRAY HEAD CONSTRUCTION

With reference to FIGS. 9-14, inclusive, of the drawings the spray head 21 is constructed from an elongated pan-shaped member 102 provided with a peripheral outturned flange 103 around its upper edge, an inverted pan-shaped member 104 having a peripheral outturned flange 105 around its lower edge, and an intermediate slide valve plate 106 positioned between the members 102 and 104, the periphery of said plate being secured to the flanges 103 and 105, respectively, of the members by screws 107. Gaskets 108 are interposed between the said plate and the flanges of the pans to provide a sealed fluid reservoir 109 above the plate 106 and a sealed air pressure chamber 110 below the plate 106. The reservoir has an enlarged valve chamber 111 above its inner end which is sealed closed by a cover plate 112, said plate having a breather hole 113 formed therethrough and mounting a ball poppet valve 114. The ball valve includes a fitting 115 having a central bore therein to loosely receive a ball 116, said bore being restricted at its lower end to form a ball seat 117. The fitting passes through a hole in the cover plate and has a head 118 in its lower end and external threads 119 at its upper end which engages a nut 120, said nut also engaging the externally threaded end of an elbow 121 that is clamped to the delivery end of the gravity flow hose 24. A float 122 is pivotally mounted within the valve chamber 111 on a bracket 123 secured to the cover plate 112 and has a valve stem 124 projecting therefrom that is provided at its outer end with a finger portion 125 adapted to unseat the ball 116 when fluid is below a predetermined level in the reservoir and having a terminal end 126 adapted to contact the head 118 after the ball 116 is unseated to preclude undue wear on the valve seat.

The plate 106 is provided with a series of longitudinally spaced apart ports 127 each having an elongated mouth 128, the effective opening of each mouth being regulated by a slide valve 129. As best illustrated in FIG. 13 each of the slide valves 129 has a rectangular base 130 formed with a downturned marginal flange 131, the upper portion of a rectangular valve body 132 being secured on the base between the flange by adhesive, or the like, the body of each valve 132 having a flat under-surface 133 adapted to slide upon the plate 106 to control the size of the opening in each port 127 and the gravity flow of liquid therethrough. Each valve base 130 is formed with a longitudinally extending sleeve 134 to freely receive a control rod 135, each base being positioned on the rod against longitudinal movement by spring washers 136—136 clamped to the rod and bearing against opposite ends of the sleeve. A rack 137 is fixed to the central portion of the control rod 135 and is slidable in a channel member 138 mounted on the plate 106, said member having inturned end portions 139 which act as longitudinal limit stops for the rack. A pinion 140 has a pintel 141 rotatable in a bearing hole 142 in the plate 106 and a manual control shaft 143 which passes through a gland 144 in the member 104. A shoulder 143a (FIG. 9) is formed on the shaft 143 to bear against the gland 144 to preclude axial displacement of the pinion 140. Thus by turning a handle 145 on the shaft 143 the bank of slide valves 129 uniformaly control the effective openings in the ports 127 which results in the even gravity flow of liquid from the reservoir 109 of the spray head through said ports.

As best depicted in FIG. 11 slide valve hold down springs 146 are mounted upon the plate 106 and each spring is generally U-shaped in plan and has a pair of resilient legs 147—147 anchored at one end by a plate 148 screwed to the plate 106 and each leg having a return flat portion 149 at its free end which slidably bears against the base 130 of the slide valve, their return end portions being connected together by a loop portion 150 that slidably engages the sleeve 134 of the valve.

With reference to FIG. 12 of the drawings each port 127 through the plate 106 communicates with a first tube 151 preferrably welded at its upper end to the underside of said plate 106, the lower end of said tube 151 abutting the upper end of a second tube 152, a flexible sleeve 153 encircling both tubes to form a sealed connection between them. The said tubes extend downwardly through the air pressure chamber 110, the lower portion of the second tube being embedded in a nozzle block 154 positioned in a laterally restricted bottom 155 of the channel member 102 of the spray head. As illustrated in FIG. 8 fillers 156 may be interposed in the bottom 155 between adjacent nozzle blocks 154.

Now with reference to FIGS. 12 and 14 of the drawings it will be noted that the bottom 155 of the air pressure chamber 110 has an under surface 157 provided with a series of inset nozzles 158 and that the lower end of each second fluid tube 152 has a flattened, laterally extending narrow opening 159 which opens out into the central portion of each nozzle 158. Inclined air jet passageways 160—160 are formed in each nozzle block 154 and communicate at their upper ends with the air pressure chamber 110 and have their lower ends terminating in jet air ports 161—161 disposed on opposite sides of the fluid opening 159 with respect to the longitudinal extent of the spray head, said ports being also positioned within the upper portion of the nozzle 158. As indicated in FIG. 12 the jet air ports 161—161 and the fluid opening 159 are recessed within the nozzle 158 to guard them against damage and that the nozzle has sufficient inset area to permit the resultant spray caused by the confluence of the liquid flow and air jets to extend longitudinally and provide an even curtain of spray upon the lawn.

OPERATION

Figure 15:
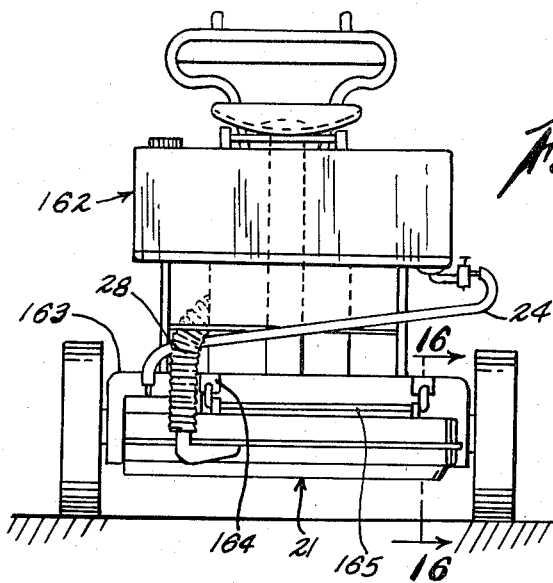
FIG. 15 is a rear elevational view of a modified form of my liquid spray device as applied to a riding mower.
Figure 16:
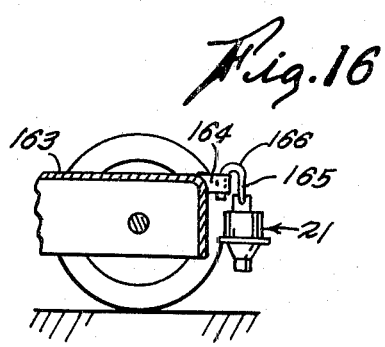
FIG. 16 is a section taken on line 16—16 of FIG. 15.

It will be understood that my liquid spray unit could be detachably mounted on a power riding lawn mower 162 as illustrated in FIGS. 15 and 16 of the drawings it being noted that the rear portion of the lawnmower deck 163 could be provided with rearwardly extending lugs 164 and that the spray head 21 of the unit could have a pivot bar 165 mounted thereon, said bar having downwardly turned hook portions 166 detachably engaged in the lugs 164.

Figure 17:
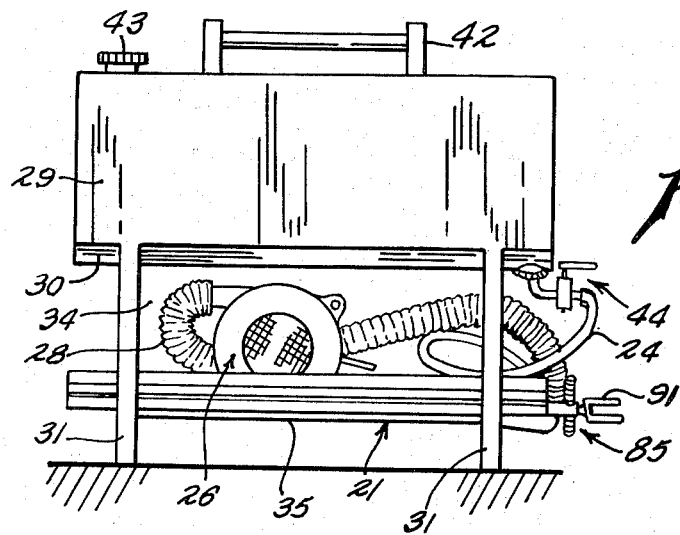
FIG. 17 is a front elevational view of my liquid spray device in its portable condition detached from a lawnmower.

My unit may be readily stored and transported in the manner illustrated in FIG. 17 of the drawings wherein the legs 31—31 receive between them the blower 26 and the spray head 21, said spray head and blower resting upon the shelf 35 and the back wall 34. The liquid spray unit as depicted in the portable condition is carried to the lawnmower and the parts readily assembled thereon in the position indicted in FIG. 1 of the drawings whereafter the clutch lever 81 is operated to bring the drive wheel 58 into driving engagement with the driven member 66 of the blower, it being understood that the engine for the power lawnmower had been in operating condition. Operation of the blower will cause a buildup of air pressure in the chamber 110 of the spray head through its connection with the flexible tube 28. The tank 29 is then filled with the proper liquid and the valve 44 opened, the liquid level in the spray head being regulated by the float valve arrangement 111. Handle 145 is then regulated to secure the proper spray application desired upon the lawn and the lawnmower is then operated in the usual manner to cut the lawn and simultaneously apply the sprayed liquid upon the lawn or in the alternative the liquid may be shut off at the plug valve 44 and the spray head swung upwardly on the hinge 92–93 when for some reason certain areas of the lawn do not require the liquid spray application.

It has been found that with the spray head 21 operatively positioned on the lawnmower deck to maintain the longitudinally spaced apart nozzles 158 about 2 inches above the vegetation to be treated that a liquid spray application of approximately 4 inches in length will be created by each nozzle, adjacent spray areas overlapping somewhat to provide an unbroken curtain of spray beneath the head 21. Because of the angularity of the air passageways 160—160 as they meet on opposite sides of liquid flow tube 159 within each nozzle, the resultant spray will be predominantly applied angularly onto the vegetation thereby effectively depositing much of the spray under and around the vegetation being treated.

What is claimed is:

1. A liquid spray device comprising a wheeled ground vehicle, an elongated spray head mounted on the vehicle adjacent the ground and disposed normal to the path of travel of the vehicle, said spray head having an upper liquid reservoir and an air pressure chamber positioned below the reservoir, an engine on the vehicle, a blower mounted on the vehicle, power transmission means between the blower and the engine, and liquid tank on the vehicle positioned on a level above the spray head, a gravity flow hose connecting the tank and the liquid reservoir in the spray head, an air pressure conduit between the blower and the air pressure chamber, a number of longitudinally spaced apart nozzles in the bottom of the spray head, a liquid flow tube depending through the chamber and connecting each nozzle with the reservoir, air passageways connecting each nozzle with the air pressure chamber, valve means interposed between the reservoir and each liquid flow tube, and means uniformly controlling the flow of liquid through all of the tubes.

2. A liquid spray device as set forth in claim 1 wherein each nozzle consists of a block positioned in the bottom of the air pressure chamber and said liquid flow tube is embedded vertically in the block, and said air passageways are formed in the block in oppositely inclined positions with respect to the liquid flow tube.

3. A liquid spray device as set forth in claim 2 wherein each nozzle is downwardly opening and inset in the head and the air passageways and the liquid flow tube have their exit ports positioned in the top portion of the nozzle.

4. A liquid spray device as set forth in claim 3 wherein the exit port of the liquid flow tube is narrow and laterally elongated with respect to the longitudinal dimension of the spray head, and the exit ports of the air passageways are in laterally spaced positions in the block with respect to the liquid flow tube.

5. A liquid spray device as set forth in claim 4 wherein the operative nozzle distance above the ground is approximately half the effective width of the spray emitted therefrom.

6. A liquid spray device as set forth in claim 1 wherein a slide valve plate is interposed between the air pressure chamber and the liquid reservoir, said plate having a number of longitudinally spaced ports therethrough, each port communicating with a liquid flow tube, said valve means comprising a valve body slidable upon the plate adjacent each port, the means uniformly controlling liquid flow through the ports comprising a rod connecting all the valve bodies together for sliding movement, and control means for the rod.

7. A liquid spray device as set forth in claim 6 wherein each valve body has a longitudinally disposed sleeve thereon, the rod freely passes through each sleeve, and a restraining washer is fixed to the rod on each side of the sleeve.

8. A liquid spray device as set forth in claim 7 wherein spring hold down means is anchored on the slide plate and have free ends which slidably bear upon opposite sides of the sleeve.

9. A liquid spray device as set forth in claim 8 wherein the free ends of the hold down springs are connected by a cross over loop which slidably engages the sleeve on the valve body.

10. A liquid spray device as set forth in claim 6 wherein the control means is a rack connected to the rod, and a manually rotatable pinion is operatively associated with the rack.

11. A liquid spray device set forth in claim 10 wherein the rack is slidable in a channel member positioned upon the slide valve plate, said channel member having reduced ends limiting longitudinal movement of the rack in the channel member.

12. A liquid spray device for rotary lawnmowers having a deck supported upon ground engaging wheels and an engine housing supported upon the deck comprising an elongated spray head adjacent to the ground and disposed normal to the path of travel of the lawnmower, said spray head having an upper liquid reservoir and an air pressure chamber positioned below the reservoir, mounting means positioning the spray head on the deck of the lawnmower, a liquid tank, a frame resting upon the deck and supporting the tank on a level above the spray head, a blower means mounting the blower on the engine housing, a clutch means interposed between the blower and the lawnmower engine, a flexible conduit connecting the pressure outlet of the blower to the air pressure chamber in the spray head, a flexible hose connected to the fluid chamber in the spray head, a valved fitting connecting said flexible hose with the tank, nozzle means along the bottom of the spray head, and control means within the spray head metering the flow of liquid and pressure air to the nozzle means.

13. A liquid spray device as set forth in claim 12 wherein the mounting means positioning the spray head on the deck includes a first channel-shaped member positioned on the deck, a vertical pivot pin fixed to the first member and having pin portions extending above and below said member, a second channel-shaped member overlying the first member and having bearings in both pivot pin portions, means connecting the second member to the spray head, and a pair of counteracting, coiled springs encircling the pin portions, the outer end of each spring being fixed to a terminal end of a pin portion and the inner ends of the springs engaging the second member whereby the spray head is maintained in a resilient, laterally extended position on the lawnmower deck.

14. A liquid spray device as set forth in claim 13 wherein the first channel-shaped member is hingedly positioned on the deck for vertical swinging movement from an operative horizontal spray head positioned to a substantially vertical inoperative spray head position.

15. A liquid spray device as set forth in claim 12 wherein the clutch means comprises an engine driven vertical power shaft, a wheel keyed to the power shaft, a centrifugal blower pivotally mounted on the engine housing and having a coaxial driven member fixed to and depending therefrom into lateral association with the wheel, a flexible lever mounted on the housing and connected to the blower, a series of teeth fixed on the housing to receive the free end of the lever and maintain the power wheel and the driven member in resilient engaged or disengaged conditions.

16. A liquid spray device as set forth in claim 15 wherein the power wheel has a peripheral groove therein, and a tire of resilient material is mounted in the groove to engage the driven member.

17. A liquid spray device as set forth in claim 12 wherein the spray head has a detachable mounting means with the deck, the blower is detachably mounted on the housing, and the frame resting upon the lawnmower deck and supporting the tank has a pair of longitudinally opposed legs, enlarged openings formed in the legs, a shelf and a side wall supported on the legs between the openings to receive and hold the blower and the spray head under the tank whereby the device can be transported and stored as a unit.

18. A liquid spray device as set forth in claim 17 wherein the tank has a pair of inverted U-shaped legs swiveled thereon which detachably engage lugs secured to the engine housing.

* * * * *